Dec. 12, 1933.                E. L. FICKEN                1,939,114
                           DEMOUNTABLE WHEEL
                           Filed April 11, 1933
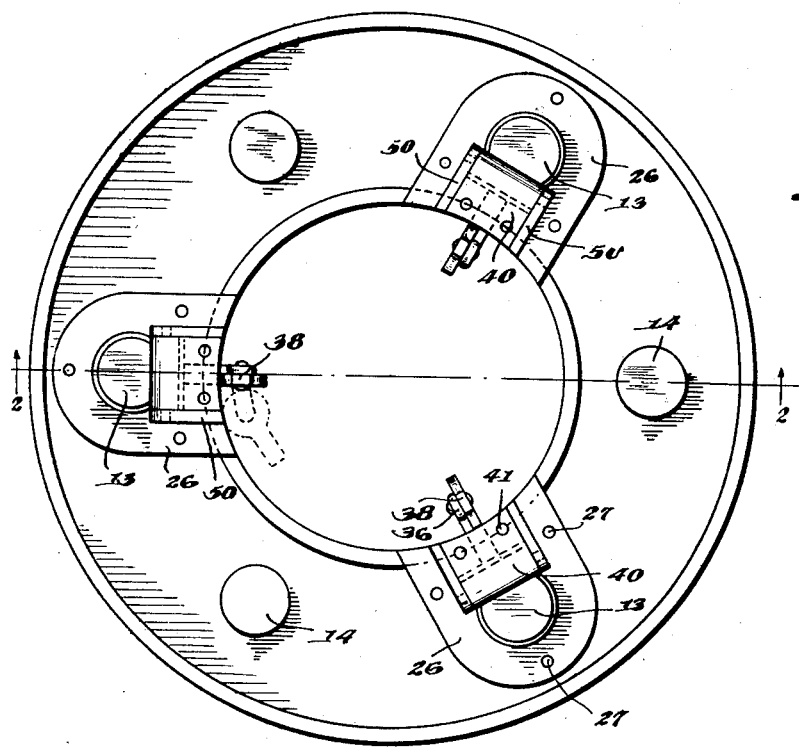
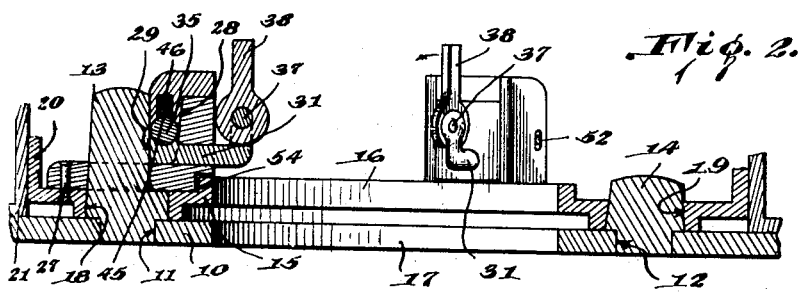
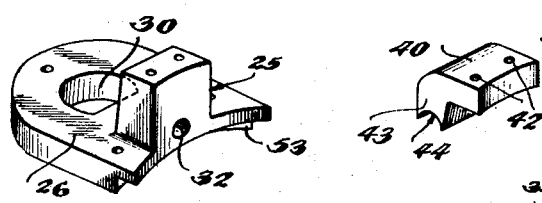
WITNESS
C. H. Mann
INVENTOR
E. L. Ficken,
BY
Munn Anderson Stanley Foster + Liddy
ATTORNEY Patented Dec. 12, 1933

1,939,114

UNITED STATES PATENT OFFICE 1,939,114

DEMOUNTABLE WHEEL

Edward L. Ficken, Atlanta, Ga.

Application April 11, 1933. Serial No. 665,604

7 Claims. (Cl. 301—6)

This invention relates to demountable wheels.

An object of the invention is the provision of a wheel having a hub portion which may be readily and rapidly attached to a brake drum and released with very few operations.

An object of the invention is the provision of a demountable wheel having a hub section provided with passages to receive studs secured to a brake drum with means for frictionally locking shoes connected with the hub section to the studs.

A further object of the invention is the provision of a demountable wheel having a hub section provided with openings and shoes connected with the hub section adjacent the openings, the openings being adapted to receive studs secured to a brake drum and spaced from the shoes, the adjacent faces of the studs and shoes being inclined to provide a tapering recess to receive rollers which frictionally lock the shoes to the studs, a spring being employed for maintaining the rollers in frictional engagement with the faces, means being employed for releasing the rollers to permit ready removal of the hub section from the brake drum.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a view in elevation of a demountable wheel constructed in accordance with the principles of my invention with the tire removed, Figure 2 is a horizontal section taken along the line 2—2 of Figure 1, Figure 3 is a view in perspective of a shoe adapted to be secured to a hub section of a wheel, Figure 4 is a view in perspective of a closure plate for a tapering recess formed between a shoe on the hub section and a lug on the brake drum, Figure 5 is a view in perspective of one of the side closure plates for the recess, Figure 6 is a view in perspective of a roller for frictionally locking the hub section to the brake drum, and Figure 7 is a view in perspective of a pin for releasing a friction roller which locks the hub section to the brake drum.

Referring more particularly to the drawing, 10 designates a brake drum having openings 11 and 12 in which are mounted studs 13 and 14, respectively. These studs may be riveted or welded or secured in any approved manner. It will be noted that the studs 14 are shorter than the studs 13.

A hub section 15 of a wheel is provided with a central opening 16 adapted to align with an opening 17 in the brake drum 10. The hub section is provided with passages 18 and 19 to receive respectively the studs 13 and 14. It will be noted that the portion of each of the studs which passes through the hub section 15 is of greater diameter than the portion which passes through the openings 11 and 12 in the brake drum so that a shoulder is formed on the stud which rests upon the brake drum 10.

The hub section is provided with a flange 20 which is secured to an annular flange 21 and the inner edge of the flange 21 rests upon the brake drum 10.

A shoe, generally designated by the numeral 25, projects laterally from the hub section 15 and is carried by a base member 26 formed integrally therewith. The base member is secured at 27 to the hub section 15 in any approved manner. It will be noted that the shoes 25 are spaced from the studs 13 and the outer face of each shoe is inclined at an angle as shown at 28. A face 29 of each stud 13, which is opposite the face 28 of a shoe 25, likewise is inclined outwardly to provide a tapering recess for a purpose which will be presently explained. Each base member is provided with an opening 30 which is received by a lug 13.

A pin 31 is rotatably mounted in a passage 32 in the shoe 25 and transversely thereof. This pin is provided with a cam member 33 having a seat 34 upon which a roller 35 rests at times. The outer end of the pin is bent in the form of an eye 36 which receives a pin 37 in the inner end of a handle 38.

A plate 40 is secured in any approved manner by means of pins 41 passing through openings 42 in the plate 40 and into passages in the top of the shoe 25. This plate is provided with a projection 43 having a curved seat 44 to engage the roller 35. The projection is provided with a pocket 45 which receives a spring 46 and this spring has its inner end pressing against the roller 35.

A pair of plates 50 are secured in any approved manner to the sides of the shoes 25 for closing the ends of the recess 28 to maintain the roller 35 in position. Each plate is provided with an elongated slot 51 to receive the pintles 52 on the ends of the rollers 35 for maintaining the rollers in a predetermined position while permitting outward movement of the rollers as will be presently explained.

The inner edge of the base member 26 of the shoe 25 is provided with a cut-out portion 53 which is received by a complementary cut-out portion 54 on the hub section 15. The shoulders thus formed aid in maintaining the shoes in proper position.

The operation of my device is as follows: With the rollers 35 in position and the cam member 33 in the position shown in Figure 2, the roller will be moved into engagement with the curved seat 44 on the projection 43 of the plate 40. Thus the roller will be out of engagement with the inclined faces 28 and 29, respectively, of the shoes 25 and the studs 13. In other words, since the recesses are tapered inwardly the narrower portions will be nearer the brake drum 10 while the expanded portions will be at the outer portions of the recesses. With the rollers 35 in the outward position and against the seats 44 the hub 15 may be readily slipped off the brake drum 10 since the rollers 35 do not lock the shoes 25 to the studs.

In order to lock the hub section to the brake drum 10, it is only necessary to move the arms 38 downwardly in flat contact with the hub section 15 as shown in dotted lines in Figure 1. When this is done the cam member 33 will be moved from its supporting position relative to the roller 35 and the springs 46 will force the rollers 35 into wedging action with the restricted portion of the tapered recesses between the shoes 25 and the lugs 13 so that the rollers will frictionally lock the hub section to the brake drum.

When it is desired to remove the wheel from the brake drum it is only necessary to raise the arms 38 to the position shown in Figs. 1 and 2 when the cam members 33 will again elevate the rollers 35 and release said rollers from their frictional engagement between the inclined faces of the shoes 25 and the studs 13.

In effect the shoes 25 are lugs which project outwardly from the base member 26 and these are spaced around the hub section as shown in Fig. 1. The studs 14 which are received by the passages 19 in the hub section 15 aid in maintaining the wheel on the brake drum at spaced points in connection with the studs 13.

I claim:

1. A demountable wheel comprising a brake drum, studs projecting from a face of the drum, each stud having an inclined face, the wheel having a hub section provided with openings to receive the studs, a shoe on the hub section adjacent each stud and having a face complementarily inclined to the face of each stud to provide an inwardly tapering recess, a roller in the recess, means for urging the roller into the restricted portion of the recess for locking the hub section to the brake drum, and means for moving the roller into the expanded portion of the recess to release the hub section from the drum.

2. A demountable wheel comprising a brake drum, studs projecting from a face of the drum, each stud having an inclined face, the wheel having a hub section provided with openings to receive the studs, a shoe on the hub section adjacent each stud and having a face complementarily inclined to the face of each stud to provide an inwardly tapering recess, a roller in the recess, means for urging the roller into the restricted portion of the recess for locking the hub section to the brake drum, each shoe being provided with a transverse passage, a pin rotatably mounted in said passage, a cam on the inner end of the pin adapted to engage the roller and move the same into an operative position, and means for rotating said pin.

3. A demountable wheel comprising a brake drum, studs secured to a face of the drum and projecting laterally therefrom, the wheel having a hub section provided with openings to receive the studs, a shoe secured to the hub section adjacent each stud, the adjacent faces of the shoe and stud being inclined outwardly to provide a tapering recess with the expanded portion of the recess being located adjacent the outer ends of the shoe and stud, means for closing the expanded end of the recess, a roller in the recess, a spring for forcing the roller into the restricted portions of the recess for securing the hub section to the drum, and means for forcing the roller out of the restricted portion of the recess to release the hub section from the drum.

4. A demountable wheel comprising a brake drum, studs secured to a face of the drum and projecting laterally therefrom, the wheel having a hub section provided with openings to receive the studs, a shoe secured to the hub section adjacent each stud, the adjacent faces of the shoe and stud being inclined outwardly to provide a tapering recess with the expanded portion of the recess being located adjacent the outer ends of the shoe and stud, means for closing the expanded end of the recess, a roller in the recess, a spring for forcing the roller into the restricted portions of the recess for securing the hub section to the drum, a pin rotatably carried by each shoe and having a cam located at the inner end of the recess, means for rotating the pin to cause the cam to engage the roller and move the same out of engaging relation with the inclined faces of the recess to release the hub section from the brake drum.

5. A demountable wheel comprising a brake drum, studs secured to a face of the drum, the wheel having a hub section provided with openings to receive the studs, a shoe located in close association with each stud and having a base member provided with an opening received by said stud, means for securing the base members to the hub section, each shoe and lug being spaced apart and having the adjacently disposed faces inclined outwardly to provide a tapering recess, a roller located in the recess, a plate secured to the outer end of the shoe to close the outer end of the recess, a spring urging the roller inwardly of the recess for locking the shoe to the lug, means in the recess for moving the roller to shoe-releasing position, and means for actuating the last-mentioned means.

6. A demountable wheel comprising a brake drum, studs secured to a face of the drum, the wheel having a hub section provided with openings to receive the studs, a shoe located in close association with each stud and having a base member provided with an opening received by said stud, means for securing the base members to the hub section, each shoe and lug being spaced apart and having the adjacently disposed faces inclined outwardly to provide a tapering recess, a roller located in the recess, a plate secured to the outer end of the shoe to close the outer end of the recess, a spring urging the roller inwardly of the recess for locking the shoe to the lug, a cam at the inner end of the recess adapted to be moved into operative relation with the roller for shifting the roller out of locking engagement between the shoe and lug, and means for actuating the cam.

7. A demountable wheel comprising a brake drum, studs secured to a face of the drum, the wheel having a hub section provided with openings to receive the studs, a shoe located in close association with each stud and having a base member provided with an opening received by said stud, means for securing the base members to the hub section, each shoe and lug being spaced apart and having the adjacently disposed faces inclined outwardly to provide a tapering recess, a roller located in the recess, a plate secured to the outer end of the shoe to close the outer end of the recess, said plate having a lip projecting into the outer end of the recess and provided with a pocket, a spring in the pocket for urging the roller into the reduced portion of the recess so that the roller will frictionally engage the inclined faces and lock the hub section to the drum, and means for moving the roller out of engagement with the inclined faces for releasing the hub section from the drum.

EDWARD L. FICKEN.